(12) United States Patent
Kimura

(10) Patent No.: US 7,543,772 B2
(45) Date of Patent: Jun. 9, 2009

(54) FISHING LINE SPOOL

(76) Inventor: Fujita Kimura, 1-104, 2-1 Izumidai 7-chome, Kita-ku, Kobe-shi, Hyogo (JP) 651-1141

( * ) Notice: Subject to any disclaimer, the term of this patent is extended or adjusted under 35 U.S.C. 154(b) by 0 days.

(21) Appl. No.: 10/568,398

(22) PCT Filed: Nov. 28, 2005

(86) PCT No.: PCT/JP2005/021819

§ 371 (c)(1),
(2), (4) Date: Feb. 13, 2006

(87) PCT Pub. No.: WO2006/087858

PCT Pub. Date: Aug. 24, 2006

(65) Prior Publication Data

US 2008/0173751 A1    Jul. 24, 2008

(30) Foreign Application Priority Data

Feb. 15, 2005   (JP)  ............................ 2005-038416

(51) Int. Cl.
*A01K 89/01* (2006.01)
(52) U.S. Cl. .................. 242/322; 242/319; 242/614
(58) Field of Classification Search ................ 242/322, 242/319, 405, 588, 614
See application file for complete search history.

(56) References Cited

U.S. PATENT DOCUMENTS

| | | | | |
|---|---|---|---|---|
| 1,983,565 A | * | 12/1934 | Replogle | ................. 242/388.1 |
| 2,533,495 A | * | 12/1950 | Moffet | ........................ 242/129 |
| 2,696,951 A | * | 12/1954 | Wood | ......................... 242/323 |
| 2,824,709 A | * | 2/1958 | Macy | ........................... 225/44 |
| 4,390,142 A | * | 6/1983 | Cheng | ..................... 242/388.1 |
| 5,992,787 A | * | 11/1999 | Burke | ...................... 242/388.1 |
| 6,003,800 A | * | 12/1999 | Adenot et al. | ............... 242/306 |
| 6,554,218 B2 | * | 4/2003 | Buyce et al. | ............. 242/388.6 |
| 7,032,854 B2 | * | 4/2006 | Marsden | .................. 242/388.1 |
| 7,303,162 B2 | * | 12/2007 | Burke et al. | ............. 242/405.2 |

FOREIGN PATENT DOCUMENTS

| | | |
|---|---|---|
| JP | 29-10930 | 9/1954 |
| JP | 31-17557 | 10/1956 |
| JP | 05-041937 | 2/1993 |
| JP | 09-240926 | 9/1997 |

(Continued)

*Primary Examiner*—Emmanuel M Marcelo
(74) *Attorney, Agent, or Firm*—Jordan and Hamburg LLP

(57) ABSTRACT

An object of this invention is to provide a fishing line spool which is capable of securely holding a fishing line wound around the fishing line spool and reduced in cost.

The fishing line spool is provided with a hollow core, a pair of flanges, and doors which are formed integrally. The doors are provided on outer peripheries of the flanges. The doors change postures between a closed posture in which tips of the doors are brought into contact to each other and an open posture in which the tips depart from each other. Each of the doors is formed from an elastic disc. Each of the doors is so curved that the tips of the doors press against each other in the closed posture. A pinching plate for pinching a fishing line is provided on the tip of each of the doors. The hollow core, the flanges, and the doors are made from a biodegradable resin.

4 Claims, 4 Drawing Sheets

FOREIGN PATENT DOCUMENTS

| | | |
|---|---|---|
| JP | 2001-148988 | 6/2001 |
| JP | 2001-211799 | 8/2001 |
| JP | 2002-153189 | 5/2002 |
| JP | 2003-164245 | 6/2003 |
| JP | 2004-154152 | 6/2004 |

* cited by examiner

FISHING LINE SPOOL

BACKGROUND OF THE INVENTION

1. Technical Field

This invention relates to a structure of a fishing line spool around which a long fishing line is to be wound.

2. Background Art

A fishing line is generally sold and used in a state that it is cut to a certain length of from 50 to 200 m and wound around a fishing line spool. A fishing line spool is generally in the form of a bobbin. Such fishing line spool has a cylindrical portion around which a fishing line is wound and flanges disposed at opposite ends of the cylindrical portion. When the fishing line is used as a so-called line, the overall fishing line wound around the fishing line spool is used at one time. In turn, when the fishing line is used as a leader, for example, an angler draws out a required length of the fishing line from the fishing line spool to use the drawn fishing line as the leader. The rest of the fishing line is retained in a state where a leading end of the fishing line is hitched to the fishing line spool.

In the case of retaining the fishing line on the fishing line spool, the leading end of the fishing line must be held by the fishing line spool. Therefore, some of conventional fishing line spools have a holding member or a holder for holding the leading end of the fishing line. A form and a structure of such holding member or holder are disclosed in JP-A-2004-154152, JP-A-2003-164245, JP-A-2001-211799, JP-A-2001-148988, and JP-A-9-240926, for example.

Patent Publication 1: JP-A-2004-154152

Patent Publication 2: JP-A-2003-164245

Patent Publication 3: JP-A-2001-211799

Patent Publication 4: JP-A-2001-148988

Patent Publication 5: JP-A-9-240926

DISCLOSURE OF INVENTION

Problem to be Solved

A typical example of the conventional holding member is a slit provided on the fishing line spool. More specifically, the leading end of the fishing line wound around the fishing line spool is inserted into the slit formed on the flange of the fishing line spool to be held at the slit. However, when the fishing line spool is put into a pocket of clothes that an angler wares, the fishing line can sometimes come off from the slit.

A typical example of the conventional holder is a spool case for housing the fishing line spool. The spool case is formed of two parts, and the parts are fitted to each other to enclose the fishing line spool. A leading end of the fishing line wound around the fishing line spool is inserted into the fitting portion of the spool case to be held at the fitting portion. Another example of the conventional holding member is a line holding band which is fitted to the fishing line spool. The line holding band is fitted to the fishing line spool in such a fashion as to cover the fishing line wound around the fishing line spool, thereby holding the fishing line. The leading end of the fishing line wound around the fishing line spool is drawn out through a fishing line draw-out hole formed on the line holding band.

The above-described spool case or the line holding band protects and securely holds the fishing line. However, each of the spool case and the line holding band is usually made from a resin and formed separately as an independent component part. Further, the spool case and the line holding band are dumped as wastes after the overall fishing line is used. Therefore, from the viewpoints of environment conservation and effective resource utilization, the spool case and the line holding band must be omitted insofar as possible. In addition, provision of the spool case or the line holding band causes a large increase in production cost of the fishing line as one product (a set of a fishing line spool and a fishing line wound around the fishing line spool).

This invention has been accomplished in view of the above-described circumstances. An object of this invention is to provide a fishing line spool which is capable of securely holding a fishing line wound around the fishing line spool and reduced in cost.

Means for Solving Problem (1) In order to achieve the above object, a fishing line spool according to this invention comprises: a hollow core having a cylindrical shape; a pair of flanges formed on opposite ends of the hollow core; and a pair of door members provided on outer peripheries of the flanges and working in cooperation with the hollow core and the flanges to define a fishing line housing. The door members are provided on the outer peripheries of the flanges in such a fashion that a rear end of each of the door members is connected rotatably on the outer periphery so that the door members change postures between a closed posture in which tips of the door members are brought into contact to each other and an open posture in which the tips depart from each other.

The fishing line is wound around an outer periphery of the hollow core to be housed in the fishing line housing. Each of the door members rotates about its rear end. The door members easily take the open posture. When the door members change the postures to the open posture, the fishing line is easily wound around the hollow core. The winding of the fishing line onto the hollow core is performed by the use of a known fishing line winding device or the like, for example. The door members rotate about the rear ends and easily change the postures to the closed posture. Thus, the fishing line housing is closed and, at the same time, the door members sandwich a leading end of the fishing line wound around the hollow core. When the fishing line housing is closed, the leading end of the fishing line is securely held so that the fishing line is prevented from being tangled inside the fishing line housing. Since the door members sandwich the leading end of the fishing line, the fishing line is protected against factors of deterioration, such as ultraviolet rays. Since the door members have the simple structure of being provided rotatably on the flanges, the door members are easily produced at a low cost.

(2) Each of the flanges may preferably have a circular shape, and each of the door members may preferably be formed from an elastic disc.

In this case, the flanges and the door members have the remarkably simple shapes. Therefore, the production cost of the fishing line spool is further reduced.

(3) The door members may preferably be so curved that tips of the door members press against each other in the closed posture.

In this case, the fishing line is automatically and elastically held between the door members only by changing postures of the door members to the closed posture. With such constitution, the leading end of the fishing line is securely held without being damaged by the pinching.

(4) A pinching plate may be provided on each of the tips of the door members so that a fishing line is pinched by the pinching plates.

The leading end of the fishing line is more securely held thanks to the pinching plates. Therefore, the leading end of the fishing line is prevented from coming off from the door members in the case where the fishing line spool is put into a pocket of clothes that an angler wares.

(5) The hollow core, the flanges, and the door members may preferably be formed integrally from a resin.

As the door members are formed integrally with the flanges, the production cost of the fishing line spool is considerably reduced.

(6) The resin used for forming the hollow core, the flanges, and the door members may preferably be a biodegradable resin.

The fishing line spool is disposed as a waste after the overall fishing line is used. Therefore, an angler is responsible for appropriately treat the fishing line spool as a dump after the use. Even if the angler inadvertently left the fishing line spool in a fishing spot, the fishing line spool is degraded in the natural world, thereby this eco-friendly product never leads to serious environmental degradation.

Effect of the Invention

As described in the foregoing, this invention enables the door members rotatably provided on the flanges to hold the fishing line and to protect the fishing line wound around the hollow core. In other words, the door members are used as a case for protecting the fishing line and as a holder for holding the leading end of the fishing line to thereby provide the fishing line spool which realizes the fishing line protection and the holding of the leading end of the fishing line and is produced at a low cost.

BEST MODE FOR CARRYING OUT THE INVENTION

Hereinafter, the present invention will be fully explained based on preferred embodiments by referring to the attached drawings.

First Embodiment

As shown in FIGS. 1 and 2, a fishing line spool 10 is used for winding up a fishing line cut to a predetermined length (e.g., about 10 to 200 m) and retaining the fishing line. The fishing line wound around the fishing line spool 10 is sold as a product such as a line and a lead.

The fishing line spool 10 is provided with a hollow core 11 (hollow core member), flanges 12, 13 (flange members), and doors 14, 15 (door members). The hollow core 11, the flanges 12, 13, and the doors 14, 15 are formed integrally from a resin. A typical example of the resin used for the hollow core 11, etc. is an SBC resin (styrene butadiene block copolymer). Note that other resins may be used insofar as they are excellent in impact resistance and flexion resistance. Also, a biodegradable resin may be used as the resin for the hollow core 11, etc. Though the hollow core 11, the flanges 12, 13, and the doors 14, 15 are formed integrally in this embodiment, they may be formed separately.

The hollow core 11 has a cylindrical shape. The fishing line is wound around an outer periphery of the hollow core 11. The flange 12 has a circular shape in this embodiment. The flange 12 is formed in a continuous fashion on one end of the hollow core 11 and extends in a radially outward direction of the hollow core 11. The flange 13 has an identical shape as the flange 12. The flange 13 is formed in a continuous fashion on the other end of the hollow core 11. Note that the shape of the hollow core 11 is not limited to the strictly cylindrical shape. It is sufficient that the hollow core 11 has a generally cylindrical shape. Also, the shape of the flange 12 is not limited to the circular shape. It is sufficient that the flange 12 is in the form of a flange projecting in the radially outward direction from the end of the hollow core 11.

The door 14 is provided on an outer periphery 16 of the flange 12. The door 15 is provided on an outer periphery 17 of the flange 13. In this embodiment, the door 14 is formed from a disc. A rear end 18 of the door 14 is connected rotatably to the outer periphery 16 of the flange 12. The connection part is reduced in thickness. With such constitution, the door 14 swings between a position indicated by a thick line and a position indicated by a double-dashed line as shown in FIG. 2. Since the door 14 is formed from the resin as described above, the door 14 has elasticity. Therefore, the door 14 swings smoothly between the position indicated by thick line and the position indicated by double-dashed line. The door 15 is symmetrical to the door 14 in structure. A rear end 19 of the door 15 is rotatably connected to the outer periphery 17 of the flange 13. The door 15 swings between a position indicated by a thick line and a position indicated by double-dashed line as shown in FIG. 2. The door 15 has the elasticity like the door 14. Therefore, the door 15 swings smoothly between the position indicated by thick line and the position indicated by double-dashed line.

The doors 14 and 15 swing to change their postures. More specifically, the door 14 and the door 15 change the postures freely between a posture (closed posture) in which the doors 14, 15 so approach to each other that tips of the doors 14, 15 are brought into contact to each other and a posture (open posture) in which the tips depart from each other. The closed posture of the doors 14, 15 is shown in each of FIGS. 1 and 2. When the doors 14, 15 take the closed posture, the hollow cores 14, 15 define a fishing line housing 20 by working in cooperation with the hollow core 11 and the flanges 12, 13. The fishing line housing 20 houses the fishing line wound around the hollow core 11. The fishing line housing 20 is opened when the doors 14, 15 take the open posture. When the fishing line housing 20 is opened, the fishing line is easily wound around the hollow core 11.

Each of the doors 14, 15 is curved as shown in FIG. 2 in this embodiment. More specifically, disc like shaped door 14 is so curved as to project in a radially outward direction of the flange 12. The disc like shaped door 15 is so curved as to project in a radially outward direction of the flange 13. By thus curving the doors 14, 15, the tips of the doors 14, 15 are pressed against each other at a certain pressure when they are in the closed posture. Also, when the doors 14, 15 are in the open posture, the open posture is maintained thanks to the curvature. Further, in this embodiment, a pinching plate 21 and a pinching plate 22 are formed on the tip of the door 14 and the tip of the door 15. The pinching plates 21, 22 are in the form of a ring and pinches the fishing line as described later in this specification.

The fishing line spool 10 according to this invention is used as described below. The postures of doors 14, 15 are changed from the closed posture to the open posture to start with. The fishing line is wound around the outer periphery of the hollow core 11 to be housed in the fishing line housing 20. The fishing line can be wound around the hollow core 11 by the use of a known fishing line winding device. In such case, the fishing line spool 10 is held and rotated by the fishing line winding device. The fishing line is wound around the hollow core 11 as the fishing line spool 10 is rotated. The fishing line spool 10 according to this invention is provided with the hollow core 11 having the cylindrical shape and formed from the resin as described above. Therefore, the fishing line spool 10 is excellent in elasticity as a structure. Accordingly, a so-called skein of fishing line is easily retained in the fishing line spool 10, so that an angler handles the skein of fishing line without trouble.

As to details of the skein of fishing line, the skein of fishing line is a fishing line which is cut to a predetermined length and wound up. The skein of fishing line is sold as a bundle of fishing lines without being wound around a fishing line spool. Therefore, the skein of fishing line does not produce any waste after being used. Accordingly, taking the environment conservation into consideration, it is preferable to trade the fishing line in the form of the skein of fishing line. However, since the skein of fishing line is a lengthy fishing line, it is difficult even for a professional fisherman to avoid tangling in storing the skein of fishing line. The skein of fishing line has not been widely used as a general fishing tool yet due to the handling difficulty.

Whereas, since the fishing line spool 10 according to this invention is excellent in elasticity as described above, an angler can elastically deform the fishing line spool 10 simply by twisting the fishing line spool 10. When the fishing line spool 10 is elastically deformed, it is easy to fit the skein of fishing line to the hollow core 11 of the fishing line spool 10. Therefore, the fishing line spool 10 according to this embodiment holds the skein of fishing line in the simple manner to make it easy to handle the skein of fishing line. As a result, the fishing line spool 10 promotes prevalence of the kase which can contribute to the environment conservation.

When the fishing line is wound around or the skein of fishing line is fit to the hollow core 11, the postures of the doors 14, 15 are changed to achieve the closed posture. Thus, the fishing line housing 20 is closed and the leading end of the fishing line wound around the hollow core 11 is pinched by the doors 14, 15. Therefore, the leading end of the fishing line is securely held by the fishing line spool and prevented from being tangled inside the fishing line housing 20. An angler has only to pull the leading end of the fishing line to draw a desired length of the fishing line from the fishing line housing 20. When the doors 14, 15 take the closed posture, the fishing line is advantageously protected against factors of deteriorating the fishing line, such as ultraviolet rays. Moreover, since the doors 14, 15 are provided rotatably on the flanges 12, 13 in the above-described simple fashion, they are produced easily and at a low cost.

As described in the foregoing, in the fishing line spool 10 according to this embodiment, the doors 14, 15 which are produced easily and at low cost function as a case for protecting the fishing line and as a holder for holding the leading end of the fishing line. Consequently, this invention provides the fishing line spool which realizes the protection of the fishing line and holding of the leading end of the fishing line and is produced at a low cost.

In this embodiment, each of the flanges 12, 13 has the circular shape. Each of the doors 14, 15 provided on the flanges 12, 13 is formed from the elastic disc. Thus, the shapes of the flanges 12, 13 and the doors 14, 15 are remarkably simple. Therefore, the fishing line spool 10 has an advantage that the production cost thereof is further reduced. Further, since the flanges 12, 13 and the doors 14, 15 are molded integrally by using the resin, the production cost of the fishing line spool 10 is considerably reduced.

Particularly, since the doors 14, 15 are curved as described above, the tips of the doors 14, 15 press against each other when the doors 14, 15 are in the closed posture. Therefore, when the doors 14, 15 are in the closed posture, the leading end of the fishing line wound around the hollow core 11 is automatically sandwiched between the doors 14, 15 to be held by the doors 14, 15.

Also, since the fishing line is elastically held between the doors 14, 15, the leading end of the fishing line is securely held by the doors 14, 15 without being damaged. Since the doors 14, 15 are provided with the pinching plates 21, 22, the leading end of the fishing line is securely pinched by the pinching plates 21, 22 so that the fishing line is securely held. Therefore, the leading end of the fishing line is prevented from easily coming off from the doors 14, 15 in the case where the fishing line spool 10 is put into a pocket of clothes that an angler wares.

Moreover, the fishing line spool 10 is disposable as a waste after using the overall fishing line. In the case where the biodegradable resin is used as the resin for forming the hollow core 11, the flanges 12, 13, and the doors 14, 15, the fishing line spool 10 is degraded in the natural world even if an angler inadvertently left the fishing line spool 10 in a fishing point, thereby suppressing an adverse influence to be exerted on the environment as small as possible.

As above mentioned, the hollow core, the flanges 12, 13, and the doors 14, 15 of the present embodiment are formed integrally by a resin. Other materials except the resin, such as a rubber or a metal may also be used as a material for forming the hollow core 11, the flanges 12, 13, and the doors 14, 15. By using such rubbers or metals, the doors 14, 15 and the flanges 12, 13 will rotate smoothly, and thus, durability of thereof will be improved.

Second Embodiment

Hereinafter, description will be made on the second embodiment.

As shown in FIGS. 3 and 4, like the fishing line spool 10 according to the first embodiment, a fishing line spool 30 according to the second embodiment of this invention is used for winding and retaining a fishing line which is cut to a predetermined length (e.g., about 10 to 200 m). The fishing line wound around the fishing line spool 30 is sold as a product such as a line and a leader. The fishing line spool 30 according to this embodiment is different from the fishing line spool 10 in that each of doors 34, 35 is formed from a flat plate which is not curved though the doors 14, 15 of the fishing line spool 10 are curved (see FIG. 2) and that a boss 31 to which a driving shaft is coupled is provided. Materials used for the fishing line spool 30 and other components are the same as those of the fishing line spool 10 according to the first embodiment.

The boss 31 is allocated at the center of the hollow core 11. As shown in FIG. 3, the boss 31 has a cylindrical shape. The center of the boss 31 coincides with the center of the hollow core 11. A key groove 32 is formed on an inner periphery of the boss 31 along an axial direction. The boss 31 is connected to the hollow core via a plurality of ribs 33 (four ribs in this embodiment). Thus, high rigidity of the hollow core 11 is ensured. Therefore, any known fishing line winding device accepts the fishing line spool 30. More specifically, the fishing line spool 30 is placed in a fishing line winding device, and then a fishing line to which a predetermined tension is applied is wound around the fishing line spool 30 at a high speed. In this case, a rotation shaft of the fishing line winding device is inserted into the boss 31. Since the boss 31 is provided with the key groove 32, the boss 31 is positioned on the rotation shaft to be fixed by a key provided on the rotation shaft of the fishing line winding device.

The door 34 is provided on the outer periphery 16 of the flange 12. The door 35 is provided on the outer periphery 17 of the flange 13. In this embodiment, the door 34 is formed from a disc. A rear end 38 of the door 34 is connected rotatably to the outer periphery 16 of the flange 12. The connection part is reduced in thickness. With such constitution, the door 34 swings between a position indicated by a thick line and a position indicated by a double-dashed line as shown in FIG. 4. Since the door 34 is formed from the resin used for the fishing line spool 10 according to the first embodiment, the door 34 has elasticity, too. Therefore, the door 34 swings smoothly between the position indicated by thick line and the position indicated by double-dashed line. The door 35 is symmetrical to the door 34 in structure. A rear end 39 of the door 35 is rotatably connected to the outer periphery 17 of the flange 13. The door 35 swings between a position indicated by thick line and a position indicated by double-dashed line as shown in FIG. 4, too. The door 35 has the elasticity like the door 34. Therefore, the door 35 swings smoothly between the position indicated by thick line and the position indicated by double-dashed line.

The doors 34 and 35 swing to change postures. More specifically, the doors 34, 35 change the postures freely between a posture (closed posture) in which the doors 34, so approach to each other that tips of the doors 34, 35 are brought into contact to each other and a posture (open posture) in which the tips depart from each other. When the doors 34, 35 take the closed posture, the doors 34, 35 define the fishing line housing 20 by working in cooperation with the hollow core 11 and the flanges 12, 13. The fishing line housing 20 houses the fishing line wound around the hollow core 11. The fishing line housing 20 is opened when the doors 34, 35 take the open posture in the same manner as in the fishing line spool 10 according to the first embodiment. When the fishing line housing 20 is opened, the fishing line is easily wound around the hollow core 11.

In this embodiment, each of the doors 34, 35 is in the form of a flat plate as shown in FIG. 4. In the case where the doors 34, 35 take the closed posture, the fishing line is pinched between the tips of the doors 34, 35. The pinching plates 21, 22 are formed on the tips of the doors 34, 35 in this embodiment, too. The pinching plates 21, 22 are formed integrally with the doors 34, 35. Each of the pinching plates 21, 22 has a shape of a ring. The pinching plates 21, 22 pinch the fishing line therebetween as in the fishing line spool 10 according to the first embodiment.

In the fishing line spool 30 according to this embodiment, when the postures of the doors 34, 35 are changed to achieve the open posture, the fishing line is wound around the outer periphery of the hollow core 11 to be housed in the fishing line housing 20. In this case, since the fishing line spool 30 is provided with the boss 31, it is possible to use any known fishing line winding device for automatically winding the fishing line around the fishing line spool 30. Moreover, since the high rigidity of the hollow core 11 is ensured as described above, the fishing line is wound around the hollow core 11 with a predetermined tension being applied thereon. As a result, the fishing line spool 30 has an advantage that the fishing line is wound around in a state where the fishing line is aligned in the axial direction of the hollow core.

After winding the fishing line around the hollow core 11, the postures of the doors 34, 35 are changed to achieve the closed posture. Thus, the fishing line housing 20 is closed. A leading end of the fishing line wound around the hollow core 11 is pinched between the pair of doors 34, 35. Therefore, the leading end of the fishing line is securely held, and the fishing line is prevented from being tangled inside the fishing line housing 20. In the same manner as in the fishing line spool 10 according to the first embodiment, an angler has only to pull out the leading end of the fishing line to draw out a desired length of the fishing line from the fishing line housing 20. When the doors 34, 35 are in the closed posture, the fishing line is protected from factors of deteriorating the fishing line, such as ultraviolet rays. Moreover, since the doors 34, 35 are provided rotatably on the flanges 12, 13, the doors 34, 35 are produced easily and at a low cost.

Therefore, in the fishing line spool 30 according to this embodiment, the doors 34, 35 which are produced easily and at a low cost function as a case for protecting the fishing line and as a holder for holding the leading end of the fishing line. Consequently, this invention provides the fishing line spool which realizes the protection of the fishing line and holding of the leading end of the fishing line and is produced at a low cost.

In the fishing line spool 30, each of the flanges 12, 13 has the circular shape, too. Each of the doors 34, 35 provided on the flanges 12, 13 is formed from the elastic disc. Thus, the shapes of the flanges 12, 13 and the doors 14, 15 are remarkably simple. Therefore, the fishing line spool 30 has an advantage that the production cost thereof is further reduced. Further, since the hollow core 11, the flanges 12, 13, and the doors 14, 15 are molded integrally by using the resin, the production cost of the fishing line spool 30 is considerably reduced.

Particularly, since each of the doors 34, 35 is in the form of a flat plate unlike the doors 14, 15 of the fishing line spool 10 according to the first embodiment, the doors 34, 35 have an advantage of being formed in a more simple manner. Also, as in the fishing line spool 10 according to the first embodiment, when the doors 34, 35 are in the closed posture, the leading end of the fishing line wound around the hollow core 11 is automatically sandwiched between the doors 34, 35 to be held by the doors 34, 35. Also, since the fishing line is softly held between the doors 34, 35, the leading end of the fishing line is not damaged. However, the doors 34, 35 may be curved like the doors 14, 15 of the fishing line spool 10 according to the first embodiment.

A biodegradable resin may be used as the resin for forming the hollow core 11, the flanges 12, 13, and the doors 34, 35 also in this embodiment. As described in the foregoing, the fishing line spool 30 is disposable as a waste after using the overall fishing line. In the case where the biodegradable resin is used as the resin for forming the hollow core 11, the flanges 12, 13, and the doors 34, 35, the fishing line spool 30 is degraded in the natural world even if the angler inadvertently left the fishing line spool 30 in a fishing point, thereby suppressing an adverse influence to be exerted on the environment as small as possible.

EXPLANATION OF REFERENCE NUMBERS

Figure 1:
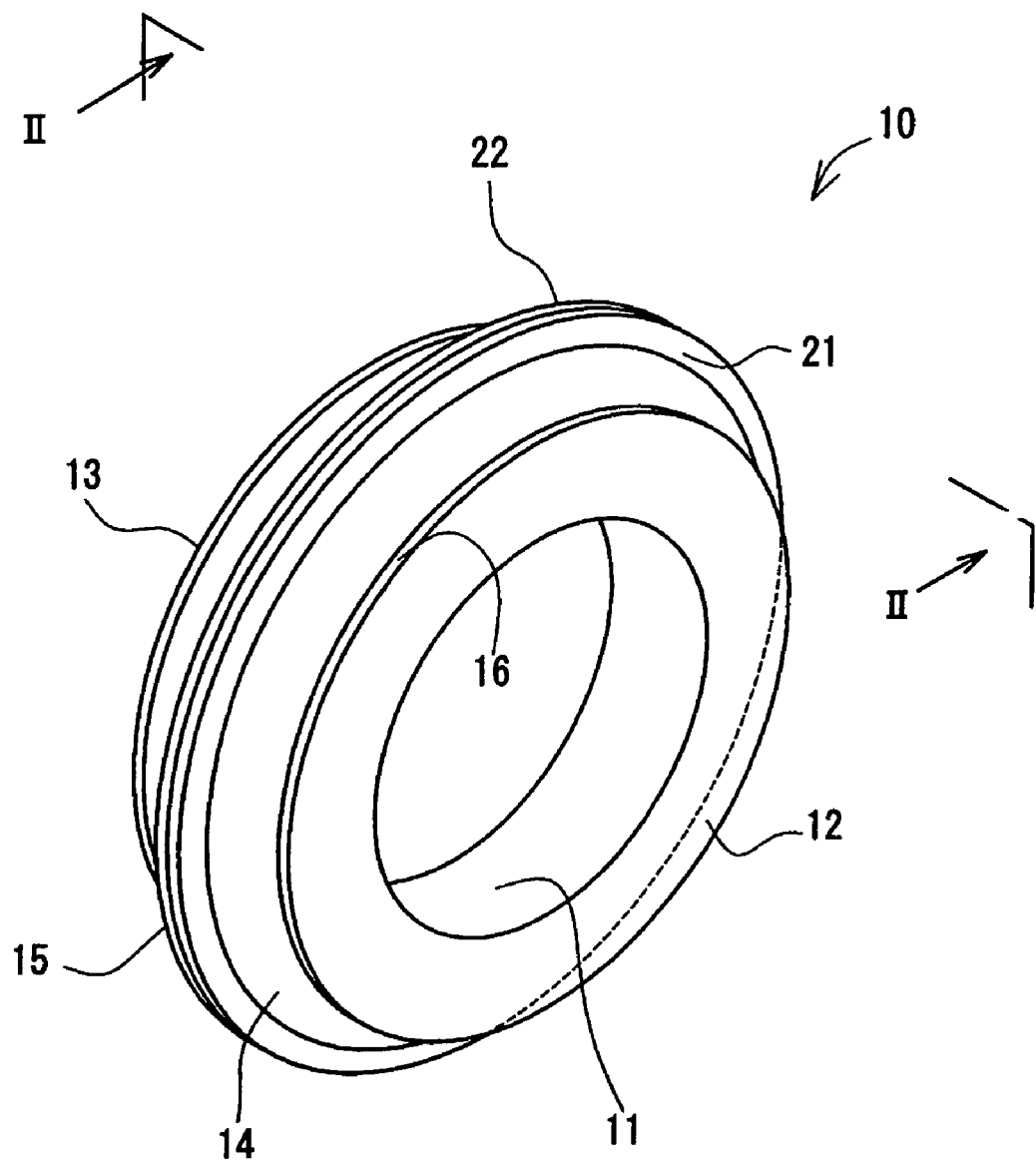
FIG. 1 is a perspective view showing a fishing line spool according to a first embodiment of this invention.
Figure 2:
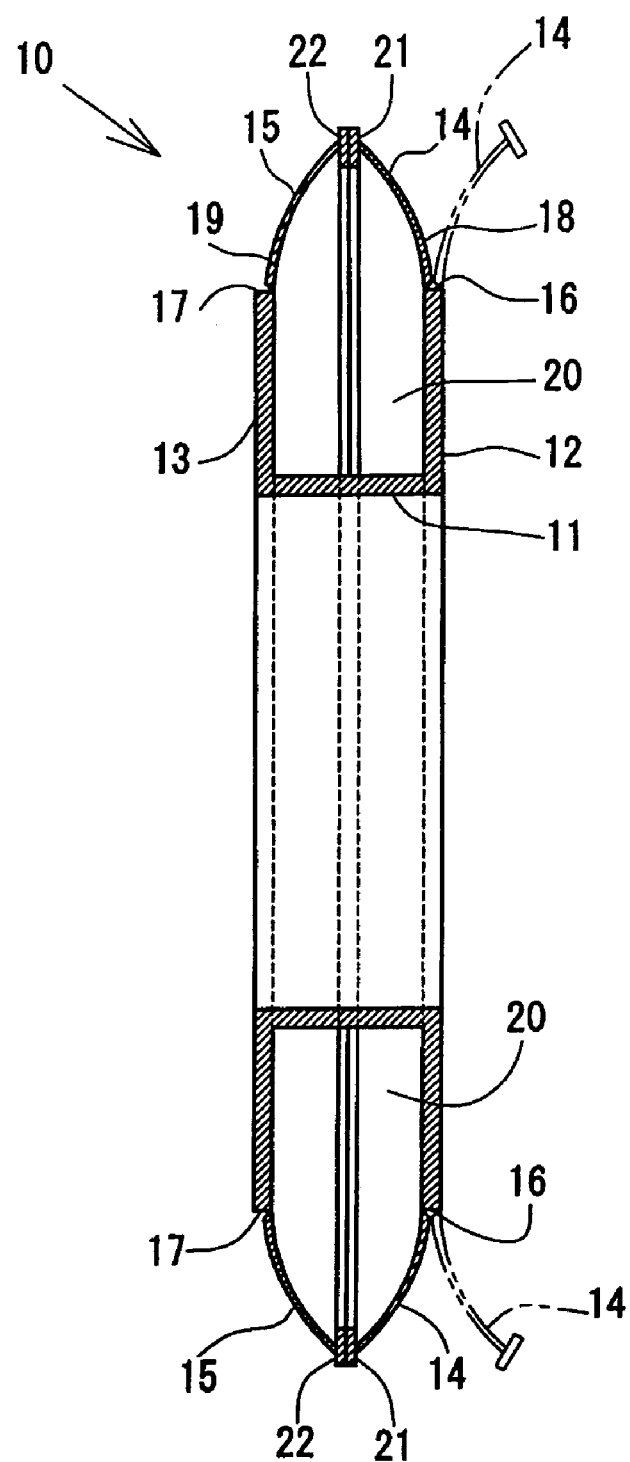
FIG. 2 is a sectional view taken along a line II-II of FIG. 1.
Figure 3:
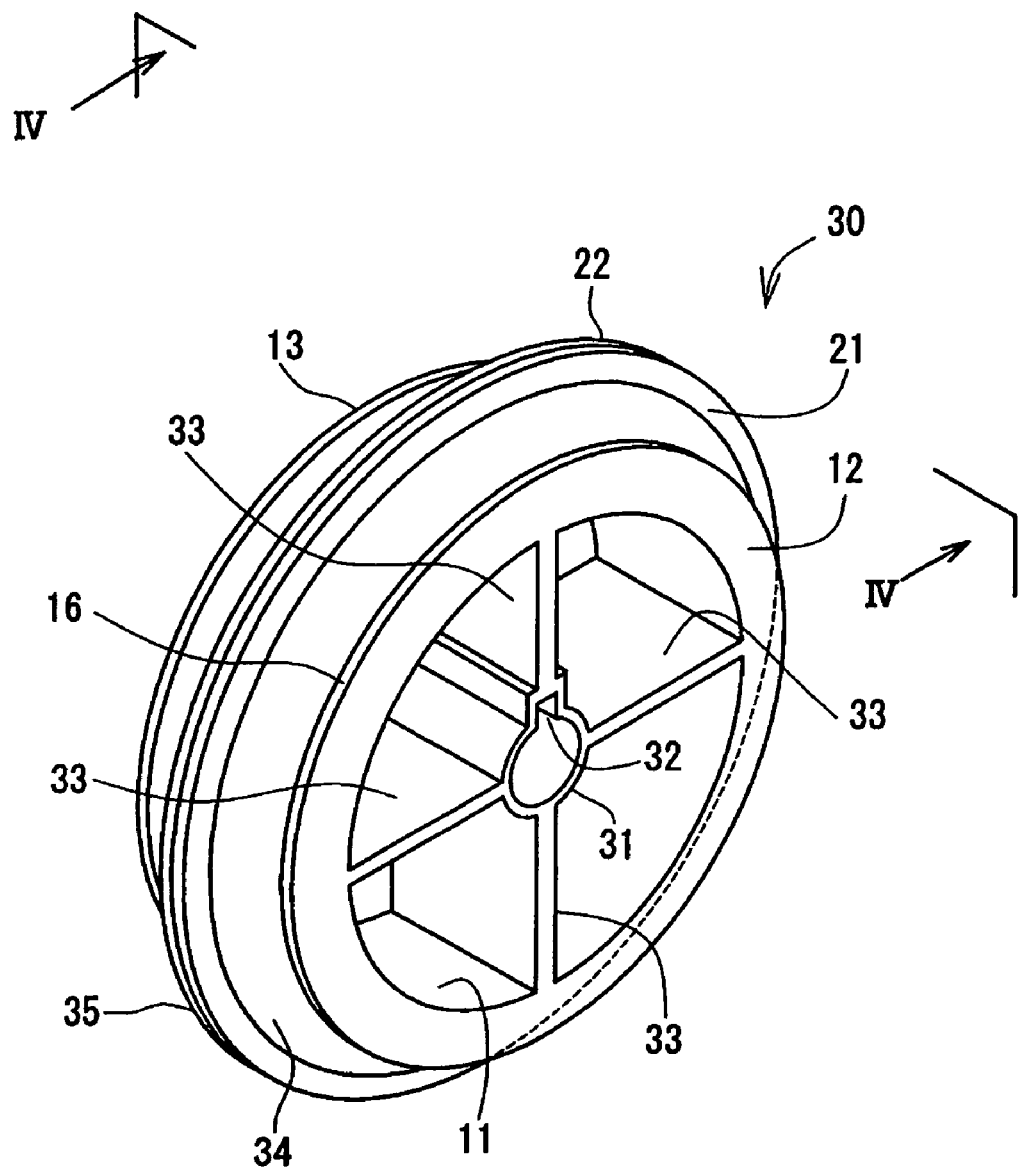
FIG. 3 is a perspective view showing a fishing line spool according to a second embodiment of this invention.
Figure 4:
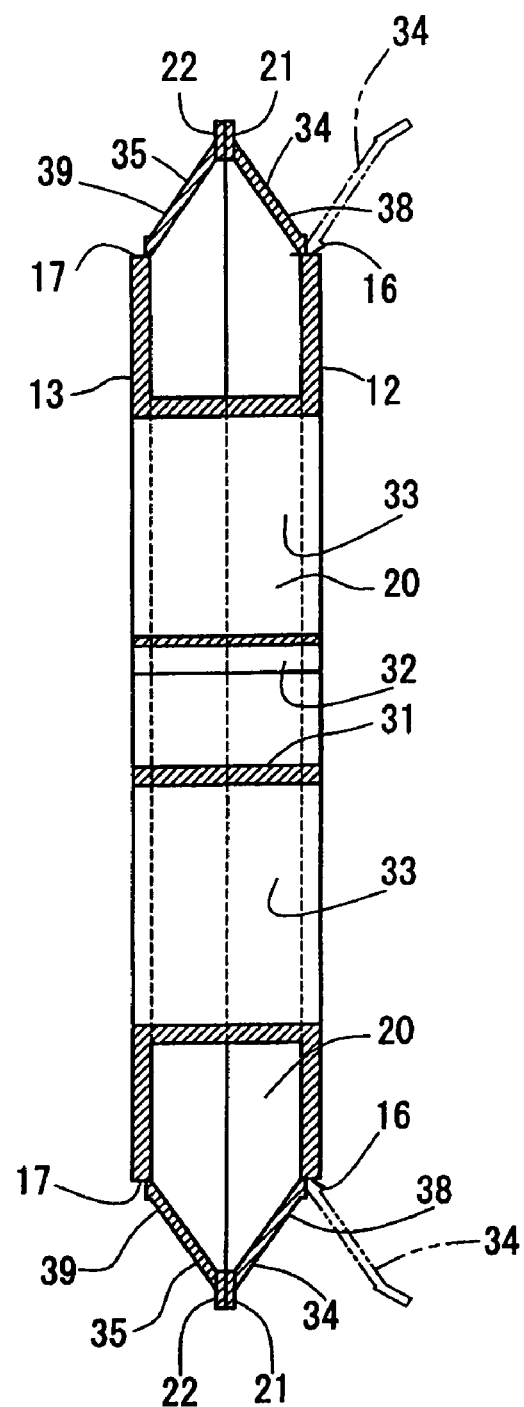
FIG. 4 is a sectional view taken along a line IV-IV of FIG. 3.

10 . . . fishing line spool
11 . . . hollow core
12 . . . flange

13 ... flange
14 ... door
15 ... door
16 ... outer periphery of flange
17 ... outer periphery of flange
18 ... rear end
19 ... rear end
20 ... fishing line housing
21 ... pinching plate
22 ... pinching plate
30 ... fishing line spool
31 ... driving shaft coupling boss
32 ... key groove
33 ... rib
34 ... door
35 ... door
38 ... rear end
39 ... rear end

The invention claimed is:

1. A fishing line spool comprising:
a hollow core having a cylindrical shape;
a pair of flanges formed on opposite ends of the hollow core; and
a pair of door members provided on outer peripheries of the flanges and working in cooperation with the hollow core and the flanges to define a fishing line housing, wherein,
the door members are provided on the outer peripheries of the flanges in such a fashion that a rear end of each of the door members is connected rotatably on the outer periphery so that the door members change postures from a closed posture in which tips of the door members are brought into contact to each other and an open posture in which the lips depart from each other
each of the door members formed from an elastic disc, and
the door members are so curved as to project in a radially outward direction of the flange so that the tips of the doors are pressed against each other at a certain pressure when the doors are in the closed posture, also when the doors are in the open posture the doors are biased to the open posture is maintained as a result of the curvature.

2. The fishing line spool according to claim 1, wherein
a pinching plate is provided on each of the tips of the door members so that a fishing line is pinched by the pinching plates.

3. The fishing line spool according to claim 1, wherein the hollow core, the flanges, and the door members are formed integrally from a resin.

4. The fishing line spool according to claim 3, wherein the resin is a biodegradable resin.

* * * * *